Patented Apr. 10, 1934

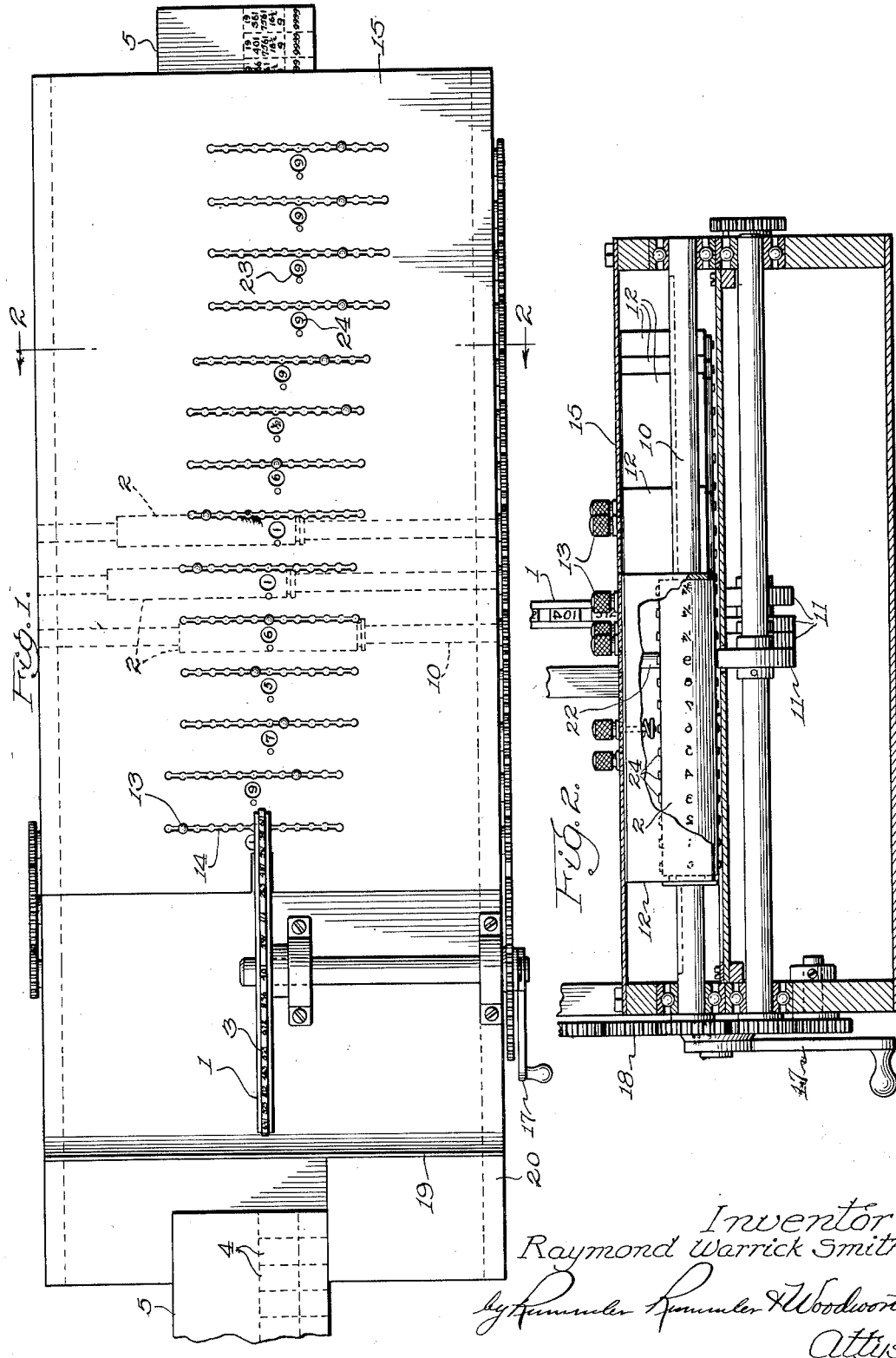

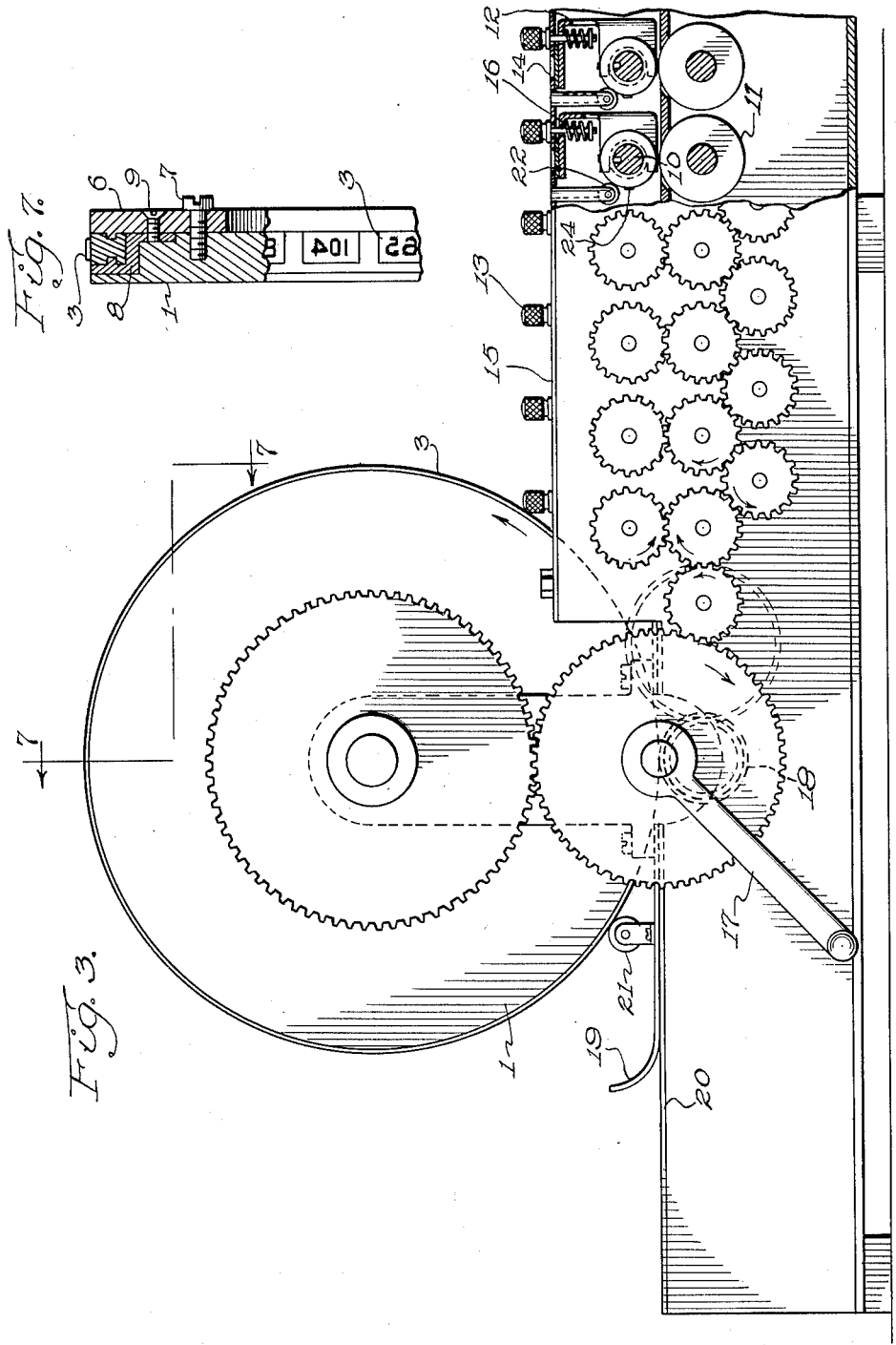

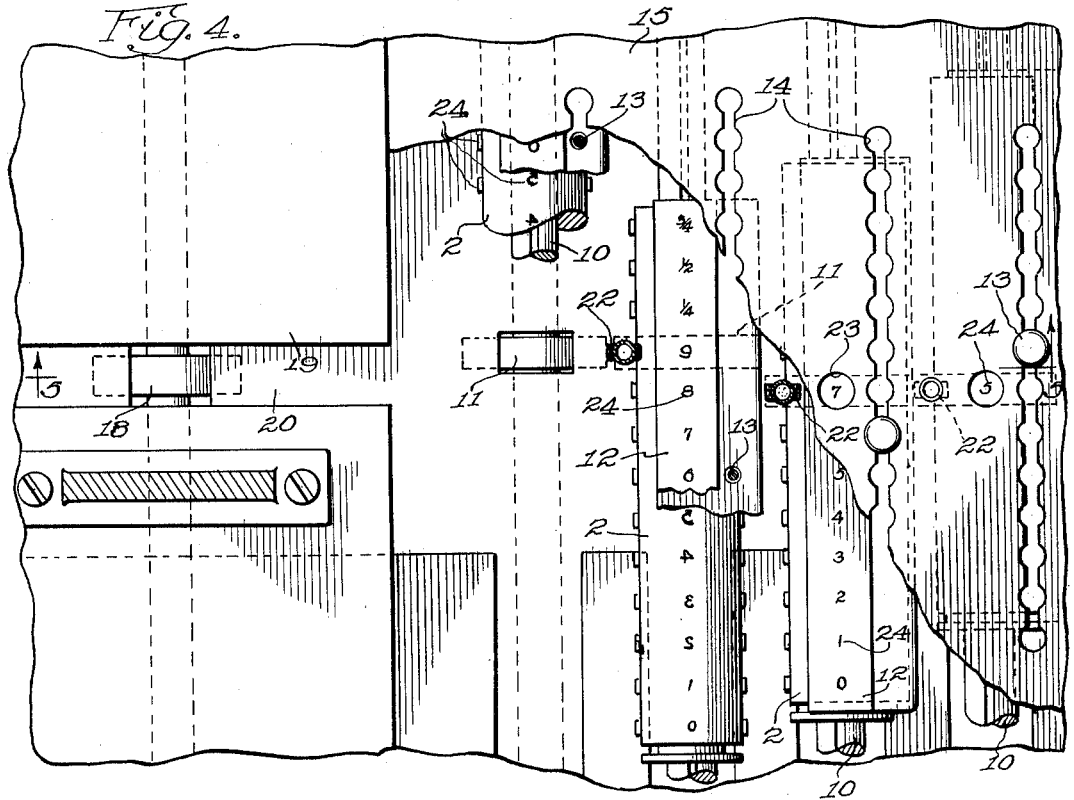
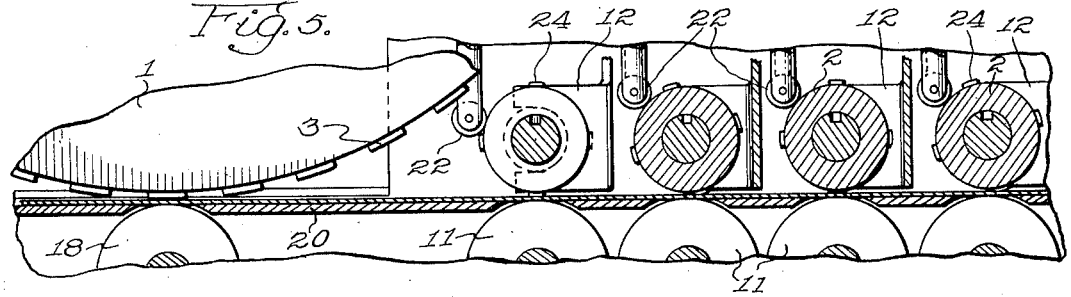
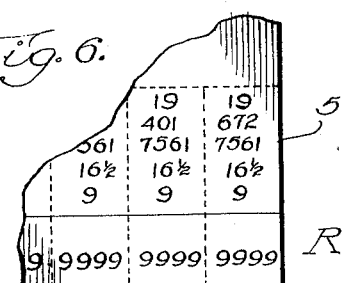
Inventor
Raymond Warrick Smith.

1,954,367

UNITED STATES PATENT OFFICE 1,954,367

JOB COUPON TICKET MACHINE

Raymond Warrick Smith, Chicago, Ill., assignor to Joel Baker, trustee

Application May 4, 1933, Serial No. 669,333

5 Claims. (Cl. 101—91)

This invention relates to printing machines of the same class as the machines described in the patents to Hoffman, Nos. 1,251,887 and 1,371,893.

The tickets which are printed by such machines consist of a series of separable coupons, one for each job to be performed in the production of a manufactured product. The tickets prior to insertion in the machine may have printed thereon some designations pertaining to the various jobs to be performed or the departments of a factory through which the work passes, and the machine to which the present invention relates is for the purpose of impressing additional items on the ticket, which items are variable according to the nature of the work to be performed.

The machine may be quickly adjusted to effect changes in items from ticket to ticket and also both repeat the same items on a series of coupons forming a single ticket and print different items on the various coupons of a ticket, according to such things as the price to be paid for piece work and other details relating to the operations to be performed by any one worker or group of workers.

The purposes of the invention are mainly to provide a machine which allows of more convenient manipulation than is possible in prior machines of this class, that is any one or number of items may be changed quickly without destroying the set-up of other items which should be the same on successive tickets. It is also a purpose of this invention to provide a machine in which needless duplication of type carriers is avoided, and one in which repeat items and variable items are printed upon the tickets as the latter pass through the machine, so that a complete ticket may be printed by one operation, and the necessity for successive operations upon any one ticket is avoided.

In prior machines of this class, a change in the setting up of type was necessary between impressions and a series of impressions was necessary in order to complete a single ticket.

In order to accomplish the purposes of this invention, a machine is provided such as illustrated in the drawings, in which:

Figure 1 shows the ticket printing machine in plan.

Fig. 2 is a transverse sectional elevation taken on the line 2—2 of Fig. 1.

Fig. 3 is a side view of the machine partly in section and partly broken away.

Fig. 4 is an enlarged fragmentary plan showing some of the longitudinally shiftable type cylinders and with the cover partly broken away.

Fig. 5 is a sectional detail as indicated by the line 5—5 of Fig. 4.

Fig. 6 is a fragmentary view illustrating the character of coupon ticket which is printed by this machine.

Fig. 7 is a sectional detail of a wheel type carrier as indicated by the line 7—7 of Fig. 3.

The tickets which are printed upon by this machine are strips of paper transversely scored or weakened along lines which will permit the separation of the various coupons forming the ticket. These coupons are generally serially numbered to designate different departments or jobs and likewise bear the same ticket number.

This machine prints items variable as to tickets and repeating as to the coupons of any one ticket, and also variable as to the coupons of any one ticket.

The plan of construction of the machine is mainly the combination of a series of rotating type carriers between which and roller platens a ticket passes on each operation of the machine. One set of these roller type carriers is in the form of cylinders which may be shifted longitudinally along their supporting and driving shafts. The cooperating platens are in the form of rollers which are stationary with reference to the longitudinal shifting of the type cylinders, but roll with the cylinders to feed the tickets, and effect repeat impressions from selected annular rows of type carried by the cylinders, each of which has a series of such annular rows which differ as to the character of the indicia thereon.

Thus the type cylinders are shiftable, to bring the items desired into printing position before the printing operation of the machine.

Associated with this set of type cylinders is a type carrying wheel which need not be shiftable in an axial direction, but carries removable type so that differing items may be printed upon a series of coupons forming a ticket.

Figure 1 of the drawings indicates the principal elements of the machine which consist of rotary type carriers 1 and 2. Type carrier 1 is in the form of a wheel and carries an annular series of type 3 corresponding in number to the series of coupons 4 of a ticket 5. At the left of this figure a fragment of a ticket is shown in position for entering the machine, and at the right a printed ticket is shown leaving the machine.

The type carrying wheel 1 is shown in sectional detail by Fig. 7. It carries a type supporting ring 6 attached thereto by the screws 7. By the flanged ring 8 attached to the ring 6 by screws 9, a channel for receiving the type 3 is formed. In changing type on this wheel, the ring 6 is removed from the wheel.

The series of type cylinders 2 are arranged in groups, for printing numbers along parallel lines extending longitudinally of the ticket.

These cylinders have extending lengthwise thereof differing characters, but like characters in annular rows around the cylinder. Any one may be shifted longitudinally along its supporting shaft 10 to bring the required set of characters opposite its cooperating platen 11. The cylinders are splined to their supporting shafts and are shiftable along the shaft by means of a yoke-shaped plate 12 having bearings on the shaft over the ends of the cylinder and carrying a shifting button 13 which projects through a slot 14 in the cover plate 15.

The slots 14 are serrated or notched in any suitable manner to retain a type cylinder in its longitudinally adjusted position. The buttons as shown have springs 16, Fig. 3, for engaging them with the recesses along the edges of the slots 14. All type carriers rotate with their supporting shafts, and these shafts and the platen carrying shafts are all geared together as shown in Fig. 3. The rotation of the set of gears is effected by operation of the crank handle 17. The tickets to be printed upon are pushed into engagement with type wheel 1 and its cooperating platen 18 and between the upper spring guide 19 and the lower supporting shelf 20 for the ticket. Then by rotating the crank handle the ticket is passed lengthwise through the machine and receives the various impressions. The type are inked by the ink rollers 21 and 22.

The impressions received from any one cylinder 2 are the same on all coupons, whereas the impressions received from wheel 1, such as varying prices for different piece work jobs, may vary from coupon to coupon. The set-up of type cylinders 2, which is effected preliminary to a printing operation by means of the buttons 13, is indicated through sight openings 23 in the cover plate 15 by numerals 24 which are carried by the type cylinder shaft yokes 12.

Although but one specific embodiment of this invention is herein shown and described, it will be understood that details of the construction shown may be altered or omitted without departing from the spirit of this invention as defined by the following claims:

I claim:

1. A coupon ticket printing machine consisting of a series of longitudinally adjustable type cylinders in combination with a type wheel, rotary platens for cooperating with said cylinders and type wheel, and means for driving all of said cylinders and type wheel whereby a ticket may be drawn through the machine and receive successive impressions from said type wheel and impressions in succession from the cylinders.

2. In a machine of the class described a series of parallel type carriers, each of said type carriers having a series of annular rows of type, means for differentially shifting said type carriers in an axial direction, a series of rotating platens relatively non-shiftable with reference to the type carriers, some of said platens being offset axially with reference to others, and means for rotating said type carriers and platens for the purpose of causing a ticket to pass therebetween and receive impressions in a plurality of rows.

3. In a machine of the class described, the combination with a type wheel having removable type, of a series of parallel type carriers, each of said type carriers having a series of annular rows of type, means for differentially shifting said type carriers in an axial direction, a series of rotating platens respectively non-shiftable with reference to the type carriers, some of said platens being offset axially with reference to others, and means for rotating said type carriers and platens for the purpose of causing a ticket to pass therebetween and receive impressions in a plurality of rows.

4. In a ticket printing machine, a series of parallel cylindrical type carriers, each having a series of annular rows of type, in combination with a series of platens for effecting an impression from one row of type only of each type carrier, means for producing a relative differential axial shift between the type carriers and the platens, and means for rotating said type carriers and platens for the purpose of effecting successive impressions upon the ticket passing therebetween.

5. In a ticket printing machine, the combination with a type carrying wheel, of a series of type carrying cylinders, each of said type carrying cylinders having a series of annular rows of type, platens of suitable width for effecting impressions from less than all of the rows of type on the cylinders, and means for effecting a relative differential axial shift between the type carrying cylinders and the platens.

RAYMOND WARRICK SMITH.